United States Patent [19]

Ishikawa et al.

[11] Patent Number: 5,428,092
[45] Date of Patent: Jun. 27, 1995

[54] RELEASE AGENT COMPOSITION

[75] Inventors: Hiroki Ishikawa; Tsutomu Naganawa; Isao Ona, all of Chiba, Japan

[73] Assignee: Dow Corning Toray Silicon Co., Ltd., Tokyo, Japan

[21] Appl. No.: 195,796

[22] Filed: Feb. 14, 1994

[30] Foreign Application Priority Data

Feb. 26, 1993 [JP] Japan .................... 5-062557

[51] Int. Cl.$^6$ ............................ C08K 5/17; C09K 3/00
[52] U.S. Cl. .................... 524/262; 524/267; 524/731; 252/382; 252/384
[58] Field of Search ............... 524/731, 262, 267; 252/382, 384

[56] References Cited

U.S. PATENT DOCUMENTS 5,157,445 10/1992 Shoji et al. .................... 355/284

FOREIGN PATENT DOCUMENTS 0395361 10/1990 European Pat. Off. ..... C08L 83/04
0440476 8/1991 European Pat. Off. ..... B29C 33/64
4238290 11/1992 Germany .................... B29C 33/64
3992 of 1978 Japan .
229719 11/1985 Japan .
275710 12/1991 Japan .

OTHER PUBLICATIONS

169306A Mar. 1989 Japanese Abstract.
3041153 Feb. 1991 Japanese Abstract.

*Primary Examiner*—Melvyn I. Marquis
*Assistant Examiner*—Karen A. Dean
*Attorney, Agent, or Firm*—Robert Spector

[57] ABSTRACT

The release agent compositions of the present invention comprise mixtures of amino-functional and amine-free polydimethylsiloxanes wherein the viscosity, amine equivalent and content of dimethylsiloxane oligomers containing up to 20 silicon atoms are within specified limits. The compositions do not evolve oily volatiles or silicon dioxide powder even during exposure to elevated temperatures.

4 Claims, No Drawings

RELEASE AGENT COMPOSITION

BACKGROUND OF THE INVENTION

1. Field of the Invention

This invention relates to a release agent comprising organosilicon compounds. More particularly, this invention relates to a release agent based on an amino-functional diorganopolysiloxane.

2. Background Information

The utility of amino-functional diorganopolysiloxanes as paint additives that provide releasability and prevent blocking is disclosed in Japanese Patent Publication Number Sho 53-3992 [3,992/1978].

The utility of amino-containing diorganopolysiloxanes as release agents for the thermoplastic resin toner in color xerographic copiers is described in Japanese Laid Open Patent Application [Kokai or Unexamined]- Number Hei 4-230784 [230,784/1992]); the use of these diorganopolysiloxanes as stress relaxers or release-improving additives for epoxy resins used as semiconductor sealants is described in Japanese Patent Application Laid Open Number Hei 3-275710 [275,710/1991]. Japanese Patent Application Laid Open Number Sho 60-229719 [229,719/1985] teaches using these diorganosiloxanes as lubricating release agents for tire-molding bladders The amino-functional dimethylpolysiloxanes described in the aforementioned laid open Japanese patent applications contain large quantities, typically from 50,000 to 200,000 ppm, of dimethylsiloxane oligomers containing up to 20 silicon atoms. During long-term use at elevated temperatures, these oligomers evaporate and stick to machinery such as exhaust fans, causing the formation of oily stains. In addition, this oil can drip onto and stain moldings.

Another very serious problem is that the dimethylsiloxane oligomer may undergo oxidation, producing a silicon dioxide powder that can adversely affect surrounding electrical/electronic components. In the specific case of xerographic copiers, the silicon dioxide powder produced by dimethylsiloxane oligomer oxidation sticks to the corotron, thereby preventing production of clear, crisp copies.

In the case of continuous industrial processes that use solvent-based paint, the binder resin is cured while evaporating the solvent by heating and the gaseous by-products are completely combusted using a platinum catalyst. However, widen an amino-containing diorganopolysiloxane is present in the solvent-based paint, the silicon dioxide powder coats the surface of the platinum catalyst honeycomb, thereby impairing the efficacy of the catalyst.

As the result of extensive investigations directed at solving the aforementioned problems associated with prior art amino-functional diorganopolysiloxanes, the present inventors discovered that the problems can be eliminated by using mixtures of amino-functional diorganopolysiloxanes and amine-free dimethylpolysiloxanes exhibiting specified limits on amine equivalent weight, viscosity, and concentration of dimethylsiloxane oligomers containing up to 20 silicon atoms, represented in this specification by the expression $Si_{\leq 20}$.

Amino-functional diorganopolysiloxanes have heretofore generally been prepared by the equilibration polymerization of a mixture of at least one cyclic dimethylsiloxane oligomer and east one cyclic amino-containing diorganosiloxane oligomer in the presence of alkali catalyst, followed by removal of the low boiling point materials in the reaction product by heating under reduced pressure. A disadvantage of this method is that the $Si_{\leq 20}$ dimethylsiloxane oligomers present in this reaction product have high boiling points, and their removal, even by heating under high vacuum, is quite problematic. Moreover, heating at excessively high temperatures can decompose the amino group. As a result, removal of this oligomer is all but impossible, which explains why prior amino-containing diorganopolysiloxanes have contained from 50,000 to 200,000 ppm of these undesirable dimethylsiloxane oligomers.

When $Si_{\leq 20}$ amino-containing cyclic diorganopolysiloxanes are converted into a thin film and distilled by heating under a high vacuum, the content of $Si_{\leq 20}$ dimethylsiloxane oligomers can be reduced to below 50,000 ppm. In the case of dimethylpolysiloxanes, after their preparation by continuous polymerization the content of $Si_{\leq 20}$ dimethylsiloxane oligomer can be reduced to below 100 ppm by conversion into a thin film and distillation at elevated temperatures using high vacuum.

SUMMARY OF THE INVENTION

The inventors have discovered that an organopolysiloxane blend with excellent release properties and that does not evolve oily material, even when used at elevated temperatures, can be obtained by blending a dimethylpolysiloxane and an amino-functional dimethylpolysiloxane if both dimethylpolysiloxanes have been heated as thin films under reduced pressure to reduce the $Si_{\leq 20}$ dimethylsiloxane oligomer content, and if the amine equivalent weight and viscosity are maintained within specified limits.

One objective of the present invention is to provide a release agent that evolves neither oily volatile materials nor silicon dioxide powder even when used at elevated temperatures.

DETAILED DESCRIPTION OF THE INVENTION

The objectives of this invention are achieved by release agent composition comprising a mixture of (A) an amino-functional diorganopolysiloxane that contains no more than 50,000 ppm $Si_{\leq 20}$ dimethylsiloxane oligomer and (B) an amine-free dimethylpolysiloxane that contains no more than 500 ppm $Si_{\leq 20}$ dimethylsiloxane oligomer, wherein said composition has an amine equivalent weight of from 1,000 to 150,000, a $Si_{\leq 20}$ dimethylsiloxane oligomer content not exceeding 5,000 ppm, and a viscosity of 50 to 30,000 centistokes at 25° C.

The amino-functional diorganopolysiloxane, referred to hereinafter as ingredient A, forms the basis of the present release agents and can be represented by the general formula

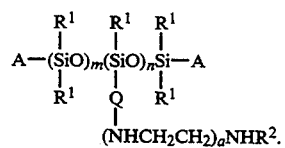

In this formula $R^1$ represents a monovalent hydrocarbon radical, and is exemplified by but not limited to $C_1$ to $C_{20}$ monovalent hydrocarbon radicals such as methyl, ethyl, propyl, butyl, pentyl, vinyl, 3,3,3-trifluoropropyl, and phenyl. The $R^1$ groups in a molecule need not all be identical. $R^1$ is most typically methyl, however combinations of methyl with other hydrocarbon radicals is also typically used for $R^1$. Preferably at least one of the $R^1$ substituents on each silicon atom is methyl. $R^2$ represents the hydrogen atom or a monovalent hydrocarbon radical that is exemplified by but not limited to methyl, ethyl, propyl, phenyl, and cyclohexyl. The group represented by A is a monovalent hydrocarbon radical as defined for $R^1$ or an organic group with the formula $$-Q-(NHCH_2CH_2)_a NHR^2$$

where a is an integer with a value of zero to 10 and it is generally zero or 1 and Q represents a divalent hydrocarbon radical, and it is exemplified by but not limited to alkylene such as $-CH_2-$,
$-CH_2CH_2-$,
$-CH_2CH_2CH_2-$,
$-CH_2CH(CH_3)CH_2-$, and
$-(CH_2)_4-$;

and alkarylene such as $$-(CH_2)_2 C_6 H_4-.$$

Q is most preferably propylene, m and n are both integers with values of at least 1, and the sum m+n is equivalent to a viscosity at 25° C. of from 50 to 30,000 centistokes ($50 \times 10^{-6}$ to $30 \times 10^{-3}$ m²/sec), preferably from 100 to 1,000 centistokes ($1 \times 10^{-4}$ to $1 \times 10^{-3}$ m²/sec). The broader viscosity range is considered optimal for the following reasons: the release performance is poor when the viscosity falls below 50 centistokes and emulsification is highly problematic when the viscosity is above 30,000 centistokes.

The amino group is generally present on a non-terminal silicon atom, but it may also be present at one or both terminal silicon atoms or at both terminal and non-terminal silicon atoms. One method for preparing the amino-functional diorganopolysiloxane is described in Japanese Patent Publication Number Sho 53-9849 [9,849/1978]. The amino-functional diorganopolysiloxane reaction product is first neutralized with, for example, acetic acid, then stripped at 150° C.–180° C. under a pressure of from 20 to 50 mm Hg, precision filtered using a filter aid, and subsequently stripped again at 180° C.–200° C. under a pressure of from 10–30 mm Hg in order to remove the $Si_{\leq 20}$ dimethylsiloxane oligomers to the greatest extent possible. The product is then converted into a thin film and the $Si_{\leq 20}$ dimethylsiloxane oligomers containing up to 20 silicon atoms are removed by evaporation.

The concentration in ingredient A of dimethylsiloxane oligomers containing up to 20 silicon atoms should be no greater than 50,000 ppm, preferably no greater than 20,000 ppm, and particularly preferably no greater than 10,000 ppm.

The dimethylpolysiloxane used as ingredient B in the present compositions must contain no more that 500 ppm of dimethylsiloxane oligomers containing up to 20 silicon atoms.

The dimethylsiloxane oligomers that should be excluded from the present compositions include both straight-chain dimethylsiloxane oligomers with the general formula $$R^3[(CH_3)_2 SiO]_m Si(CH_3)_2 R^3$$

where $R^3$ represents a hydroxyl group or a methyl radical, m is an integer with a value of zero to 19, and cyclic dimethylsiloxane oligomers containing from 3 to 20 dimethylsiloxane units per molecule.

When ingredient B contains more that 500 ppm of $Si_{\leq 20}$ dimethylsiloxane oligomers, these oligomers will evaporate from the dimethylpolysiloxane during application of the release agent at elevated temperature to cause the problems discussed in a previous section of this specification.

The linear dimethylsiloxane oligomer containing 20 silicon atoms has a boiling point of 830° C. and is volatile. The content of $Si_{\leq 20}$ dimethylsiloxane oligomers in ingredient B is preferably $\leq 400$ ppm, most preferably $\leq 100$ ppm.

The dimethylpolysiloxane used as ingredient B should have a viscosity at 25° C. of 50 to 50,000 centistokes ($5 \times 10^{-5}$ to $5 \times 10^{-2}$ m²/sec). When the viscosity is below 50 centistokes at 25° C., this ingredient will be volatile and the release performance will therefore be unsatisfactory: when the viscosity exceeds 50,000 centistokes, the release agent becomes difficult to handle due to its excessively high viscosity. Viscosities of 100 to 10 000 centistokes ($1 \times 10^{-4}$ to $1 \times 10^{-2}$ m²/sec) are preferred.

Ingredient B preferably has a straight-chain or partially branched chain structure and contains a hydroxyl or methyl radicals at its molecular chain terminals.

Ingredient B can be prepared by polymerization of a cyclic dimethylsiloxane oligomer. The reaction product is then stripped to yield a dimethylpolysiloxane containing from 5,000 to 30,000 ppm $Si_{\leq 20}$ dimethylsiloxane oligomer. The dimethylsiloxane oligomer fraction is subsequently removed using a thin-film evaporator operating at a temperature of, for example from 270° C. to 350° C. and a pressure of 0.1 to 15 mm Hg.

Alternatively, the dimethylsiloxane oligomer can be removed by extraction with various organic solvents such as an alcohols, including methanol, ethanol, n-butanol and isopropanol; ketones such as acetone and methyl ethyl ketone; hydrocarbons such as hexane, benzene, toluene, and xylene; or with mixtures containing two or more of these orgasmic solvents. The alternative purification methods can also be used in combination.

Removal of the dimethylsiloxane oligomer by organic solvent extraction is a preferred method, while removal of the dimethylsiloxane oligomer using both a thin-film evaporator and organic solvent extraction is a particularly preferred method.

The release agent compositions of the present invention comprise mixtures of ingredients A and B. The mixtures have an average amine equivalent weight of 1,000 to 150,000, a $Si_{\leq 20}$ dimethylsiloxane oligomer content not exceeding 5,000 ppm, and a viscosity of 50 to 30 000 centistokes ($5 \times 100^{-4}$ to $3 \times 10^{-2}$ m²/sec) at 25° C. The amine equivalent weight is defined as the weight of release agent composition containing one mole of amine group.

For example, a release agent composition in accordance with the present invention containing an average amine equivalent weight of 38,000, a concentration of oligomers containing no more that 20 silicon atoms of 2,400 ppm, and a viscosity of 138 centistokes ($1.38 \times 10^{-4}$ m²/sec) at 25° C. can be prepared by blending 80 weight parts of ingredient B containing 0 ppm of oligomers containing no more that 20 silicon atoms and a viscosity of 138 centistokes with 20 weight parts of an amino-functional diorganopolysiloxane having a viscosity of 138 centistokes at 25° C., an amino equivalent weight of 7,600, the average formula

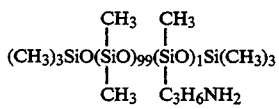

and containing 12,000 ppm of dimethylsiloxane oligomer containing not more than 20 silicon atoms.

In addition to a mixture of ingredients A and B the present release agent compositions can also contain inorganic powders such as mica, talc, zinc oxide, and calcium carbonate; organic compounds such as paraffins and waxes; and organic solvents such as toluene, xylene, hexane, heptane, and rubber volatile oil.

The compositions of this invention can be emulsified and used in this form. Thus, for example, the present compositions can be emulsified by conventional methods by blending the composition with water and at least one surfactant. Useful surfactants include but are not limited to non-ionic surfactants such as polyoxyalkylene alkyl ethers, polyoxyelkylene alkylphenol ethers, polyoxyalkylene alkyl esters, sorbitan alkyl esters, and polyoxyalkylene sorbitan alkyl esters, and cationic surfactants such as aliphatic amine salts, quaternary ammonium salts, and alkylpyridinium salts.

The release agent compositions of the present invention are useful as release-improving additives for thermosetting resins such as phenolic resins, epoxy resins, polyester resins, phenol novolac resins, urea resins, and melamine resins: thermoplastic resins such as polyvinyl chloride, polyethylene, polypropylene, vinyl acetate and its copolymers, nylon, polyesters, polystyrenes, acrylonitrile/styrene copolymers, acrylonitrile/butadiene/styrene copolymers, poly(math) acrylates, polycarbonates, polyurethanes, and polyacetals; and organic rubbers such as natural rubber, isoprene, styrene/butadiene rubber, and chloroprene polymers.

The present compositions are also useful as a release agents for the spinnerets used to produce synthetic fibers; as a release agent for the toner in xerographic copiers: as an internal addition-type release agent for plastics, organic rubbers, and silicone rubbers; as a release agent for die-casting and cast metal molding; as a release agent for the molding of articles including but not limited to rubber mats, hoses, and tires; and as a release agent for the molding of plastics.

EXAMPLES

The following examples describe preferred embodiments of the present invention and should not be interpreted as limiting the scope of the invention as defined in the accompanying examples. Unless otherwise specified all parts and percentages in the examples are by weight and viscosities were measured at 25° C. The concentrations of dimethylsiloxane oligomers were determined by gas-liquid chromatography.

Reference Example 1

This example describes the preparation of the two amino-functional diorganopolysiloxanes used as ingredient A.

Compound 1 compound 1 was an amino-functional diorganopolysiloxane with an amine equivalent weight of 15,200, a viscosity of 138 centistokes and the average formula

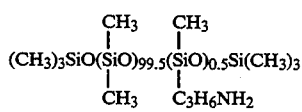

Compound 1 contained 9,750 ppm of dimethylsiloxane oligomers containing no more than 20 silicon atoms. An amino-containing diorganopolysiloxane synthesized by a conventional method and containing 145,800 ppm of dimethylsiloxane oligomers containing up to 20 silicon atoms was passed twice through a bench-top thin-film distillation unit manufactured by Shinko Pfaudler Kabushiki Kaisha using a temperature of 200° C. and a pressure of 2–3 mm Hg to reduce its dimethylsiloxane oligomer content to 9,750 ppm.

Compound 2

Compound 2 was an amino-functional diorganopolysiloxane exhibiting an amine equivalent weight of 7,330, a viscosity of 2,820 centistokes and the average formula

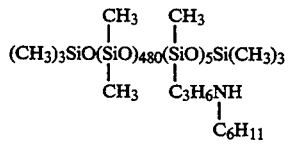

$C_6H_{11}$ = cyclohexyl

Compound 2 was prepared by passing an amino-functional diorganopolysiloxane synthesized by a conventional method twice through the same unit described for the purification of sample a using a temperature of 220° C. and a pressure of from 2 to 3 mm Hg to reduce its dimethylsiloxane oligomer content ($\leq 20$ silicon atoms) to 7,770 ppm from the initial value of 133,000.

Reference Example 2

This example describes the preparation of the two dimethylpolysiloxanes used as ingredient B.

Compound 3

Compound 3 was a dimethylpolysiloxane oil that contained 7 ppm $Si_{\leq 20}$ dimethylsiloxane oligomer and had a viscosity of 108 centistokes. This compound was prepared by synthesizing a dimethylpolysiloxane oil synthesized by a conventional method. The dimethylpolysiloxane oil contained 28,700 ppm of oligomers containing up to 20 silicon atoms, exhibited a viscosity of 100 centistokes and was passed twice through a thin-film evaporator with a column length of 4.5 m using a temperature of 270° C. and a pressure of 3–4 mm Hg in order to reduce its $Si_{\leq 20}$ dimethylsiloxane oligomer content to 3,500 ppm. This content was further reduced to 7 ppm by repeating the following alcohol extraction 7 times: shaking for 2 hours with 3 times the sample weight of ethanol, then allowing the mixture stand for 2 hours.

Compound 4

Compound 4 was a dimethylpolysiloxane oil that contained 0 ppm $Si_{\leq 20}$ dimethylsiloxane oligomer and had a viscosity of 10,002 centistokes. This compound was prepared by synthesizing a dimethylpolysiloxane oil by a conventional method. The $Si_{\leq 20}$ dimethylsiloxane oligomer content was 3,350 ppm, and viscosity was 10,000 centistokes. The initial dimethylpolysiloxane oil was treated as described for sample c to reduce its $Si_{\leq 20}$ dimethylsiloxane oligomer content to 0 ppm.

Example 1

Compounds 1 and 3 prepared as described in the foregoing reference examples were blended in the amounts reported in Table 1 to prepare a release agent in the form of an organopolysiloxane composition. This release agent was comprehensively evaluated for its suitability as a release agent by examining its release performance, the molding surface condition, and oligomer evaporation as described in the following paragraphs.

Release Performance

The release agent was applied to a steel mold with a mirror finish and designed for the molding of a 25×25×0.5 cm rubber article. This was followed by heating the mold for 15 hours at 200° C. After cooling, the mold was immersed in a bath of toluene solvent and cleaned by gentle shaking. Unvulcanized styrene/butadiene rubber was filled into the mold and vulcanized for 15 minutes at 150° C. under a pressure of 20 kg/cm². The releasability of the molding (release performance) was then evaluated.

Molding Surface Condition

The surface of the molding was visually inspected for irregularities in order to determine whether or not a mirror-smooth molding had been obtained.

Evaporation of Dimethylsiloxane Oligomer 25 cc of the release agent was placed in a 100 cc beaker, which was covered with a 200 cc beaker and heated for 5 hours at 200° C. The interior surfaces of the beakers were then examined for dimethylsiloxane oligomer that had evaporated out during heating.

The results are reported in Table 1.

The compositions corresponding to the present invention gave an excellent release performance. Moreover, the surface of the molding conformed to the mold and lacked irregularities and had a mirror finish. Finally, no evaporation of dimethylsiloxane oligomer was observed. Thus, the invention sample gave an excellent performance as a release agent.

By comparison, evaporation of dimethylsiloxane oligomer was observed for compound 1 by itself (Comparison Example 1), which was therefore unqualified for application as a release agent. In the case of compound 3 by itself (Comparison Example 2), no release was obtained because the release agent had been almost completely washed off by the solvent (toluene).

The mixture of 5 parts compound 1 and 95 parts compound 3 (Comparison Example 3) contained too little amino group. As a result, only a small amount was adsorbed or adhered to the mold, and the release performance was therefore unsatisfactory.

TABLE 1

|  | Present Invention Example 1 | Comparison Example 1 | Comparison Example 2 | Comparison Example 3 |
| --- | --- | --- | --- | --- |
| sample | mixture of 85 parts compound 3 with 15 parts compound 1 | compound 1 | compound 3 | mixture of 95 parts compound 3 with 5 parts compound 1 |
| amine equivalent weight | 101,300 | 15,200 | — | 304,000 |
| oligomer (ppm) | 1,470 | 9,750 | 7 | 495 |
| viscosity (cst) | 112 | 138 | 108 | 109 |
| release performance | excellent | excellent | no release | partial sticking by the surface, unsatisfactory release |
| molding surface condition | excellent, surface had mirror finish | excellent, surface had mirror finish | — | partial cohesive rupture |
| dimethyl-siloxane oligomer evaporation | no evaporated oligomer observed | small amount of oil droplets adhered on interior beaker surfaces | no evaporated oligomer observed | no evaporated oligomer observed |
| overall evaluation as a release agent | highly qualified | unqualified | unqualified | unqualified |

Example 2

Compounds 2 and 4, which were prepared as reported, respectively, in Reference Examples 1 and 2, were mixed as reported in Table 2 to prepare a release agent, and the properties of this release agent were evaluated as described in Example 1.

As reported in Table 2, the release agent of the invention, a mixture of 20 parts of compound 2 and 80 parts compound 4, was rated as an excellent release agent because it gave an excellent release performance, was free of dimethylsiloxane oligomer evaporation, and yielded a molding whose surface intimately conformed to the mold. In contrast to this, compound 2 (Comparison Example 4), compound 4 (Comparison Example 5), and the mixture of 2.5 parts compound 2 and 97.5 parts compound 4 (Comparison Example 6) were in each case rated as unqualified for application as a release agent.

TABLE 2

|  | present invention Example 2 | comparison examples | | |
|---|---|---|---|---|
|  |  | Comparison Example 4 | Comparison Example 5 | Comparison Example 6 |
| sample | mixture of 80 parts Comp'd. 4 with 20 parts Comp'd. 2 | Compound 2 | Compound 4 | mixture of 97.5 parts Comp'd. 4 with 2.5 parts Comp'd. 2 |
| amino equiv. weight | 36,650 | 7,330 | — | 293,000 |
| oligomer ppm | 1,550 | 7,770 | 0 | 202 |
| viscosity cst. | 7,760 | 2,820 | 10,002 | 9,690 |
| release performance | excellent | excellent | no release | partial sticking by the surface, unsatisfactory release |
| molding surface condition | excellent, surface had mirror finish | excellent, surface had mirror finish | — | partial cohesive rupture |
| dimethyl-siloxane oligomer evaporation | no evaporated oligomer observed | small amount of oil droplets adhered on interior beaker surfaces | no evaporated oligomer observed | no evaporated oligomer observed |
| overall evaluation as release agent | highly qualified | unqualified | unqualified | unqualified |

Example 3

To 30 parts of the release agent described in Example 1, mixture of 15 parts of compound 1 and 85 parts compound 3 were added 1.3 parts polyoxyethylene (8.5 mol adduct) nonylphenol ether emulsifying agent, 3.5 parts polyoxyethylene (6 tool adduct) lauryl ether emulsifying agent, and 65.2 parts water. This was followed by emulsification in a colloid mill emulsifier to prepare an emulsion. This emulsion was diluted 30-fold with water to yield a release agent for application to the molding of passenger snow tires with complex tread. Compound 1 from Example 1 was also formulated into an emulsion using the same procedure to give a release agent.

There was no difference between the two emulsions in terms of initial release performance. However, during continuous operations using the emulsion prepared using compound 1, a small quantity of tar and $Si_{\leq 20}$ dimethylsiloxane oligomer were detected on the upper mold of the Bag-O-Matic vulcanizer. During continuous operations beyond this point, splotchy stains caused by dimethylsiloxane oligomer were produced on the tire surfaces. Tires molded using the emulsified release agent of the present invention were completely free of stains caused by dimethylsiloxane oligomer.

Example 4

The following ingredients were mixed to homogeneity over 10 minutes in a Henschel mixer: 40 parts of the release agent of the present invention described in Example 2, 2,000 parts polyethylene terephthalate chips, and 0.5 parts organic pigment (Sumiplast Blue-OR from Sumitomo Kagaku Kabushiki Kaisha). Using the resultant composition as a release agent, 500 injection molding operations were carried out using a small-scale injection molder at 270° C. This molding experiment was conducted using a mold for the fabrication of an Izod impact test specimen and was run without the use of external release agent. The results of the evaluation demonstrated that injection molding could be carried out using the release agent of the present invention in an entirely problem-free manner even in the absence of an external release agent. Moreover, the perimeter around the injection section was free of dimethylsiloxane oligomer staining.

For comparison, compound 2 described in Comparison Example 4 was tested in the same experiment. The release performance was entirely problem-free just as for the addition of the release agent in accordance with the invention, and the release performance was almost on the same level. However, dimethylsiloxane oligomer was detected in the volatiles (tar) evolved from around the injection material.

That which is claimed is:

1. A release agent composition comprising
   I. an amino-functional diorganopolysiloxane represented by the average formula

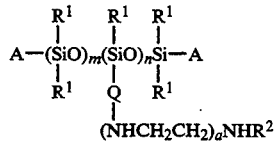

and exhibiting a viscosity at 25° C. of from 50 to 30,000 centistokes, wherein the concentration in (I) of amino-functional diorganosiloxane oligomers containing up to 20 silicon atoms is less than 50,000 ppm, based on the total weight of said amino-functional polydiorganosiloxane;
   II. an amine-free dimethylpolysiloxane exhibiting a viscosity of from 50 to 50,000 centistokes, wherein the concentration in (II) of dimethylsiloxane oligomers containing up to 20 silicon atoms does not exceed 500 ppm, based on the total weight of said dimethylpolysiloxane;
   wherein $R^1$ represents a monovalent hydrocarbon radical, $R^2$ represents a hydrogen atom or a monovalent hydrocarbon radical, a is 0 or an integer from 1 to 10, m and n are each at least 1, A is selected from the group of monovalent hydrocarbon radicals represented by $R^1$ or

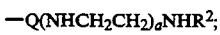

and said release agent exhibits an amine equivalent weight of from 1,000 to 150,000, a viscosity at 25° C., of from 50 to 30,000 centistokes and wherein the combined concentrations of amino-functional and amine-free diorganosiloxane oligomers containing up to 20 silion atoms does not exceed 5,000 ppm, based on the total weight of said composition.

2. A release agent according to claim 1 wherein at least one $R^1$ on each silicon atom is methyl, $R^2$ represents hydrogen, methyl, ethyl propyl, phenyl, or cyclohexyl, Q represents an alkylene or an alkylenearylene radical, said amino-functional diorganopolysiloxane (I) exhibits a viscosity at 25° C. of from 100 to 1,000 centistokes and contains no greater than 20,000 ppm of oligomeric amino-functional organosiloxanes containing up to 20 silicon atoms, a is 0 or 1, and the viscosity of said dimethylpolysiloxane (II) is from 100 to 10,000 cst.

3. A release composition according to claim 2 wherein said amino-functional diorganopolysiloxane contains not more than 10,000 ppm of amino-functional diorganosiloxane oligomers containing not more than 20 silicon atoms.

4. A release agent according to claim 3 where Q is propylene, the viscosity of said amino-functional diorganopolysiloxane is from 100 to 1000 centistokes, and A is methyl.

* * * * *